Jan. 30, 1968   B. PERKINS, JR   3,366,906

DISPLACEMENT TRANSDUCER

Filed April 25, 1966

INVENTOR
BEAUREGARD PERKINS JR.

BY Harry M. Saragovitz
Edward J. Kelly
E A. J. Dupont
ATTORNEYS

United States Patent Office 3,366,906
Patented Jan. 30, 1968

3,366,906
DISPLACEMENT TRANSDUCER
Beauregard Perkins, Jr., 3853 Leigh Place,
Ocala, Fla. 32670
Filed Apr. 25, 1966, Ser. No. 546,137
4 Claims. (Cl. 336—131)

ABSTRACT OF THE DISCLOSURE

A pair of magnetizable rods are tapered in opposite directions. They are mounted on a common base to move in unison relative to a pair of coils. A magnetic field generated by another coil is transmitted through its core and the base core to the pair of coils. However, the magnitude of the transmitted magnetic flux is proportional to the thickness of the magnetizable rods in the coils. Thus, if the base is moved near to the armature, the corresponding rod will substantially fill the air gap inside of the coil and the flow of magnetic flux to the coil will be at a maximum rate. Conversely, the small end of the other rod will transmit only a minimum of magnetic flux to its corresponding coil. The change of flow of magnetic flux, and consequent change of current flow in the coils, are proportional to displacement of the base relative to the armature. Therefore a recorder connected to the electrical leads from the coils will indicate the amount of displacement of the base relative to the armature.

---

The invention describes herein may be manufactured and used by or for the Government for governmental purposes, without the payment to me of any royalty thereon.

During a disturbance such as an earthquake or an underground explosion, in order to measure the transient displacement of the ground from a remote distance, we require an instrument that will translate the motion into a form of energy such as an electrical impulse. When transmitted to a distant point, the magnitude of the impulse can be recorded. With suitable recording equipment both the direction and magnitude of motion can be measured from the remote station.

One device to transform the displacement into an electrical signal is a potentiometer. This device requires a sliding contact running over a resistance wire. This action introduces friction into the moving system which in some cases is very undesirable. Another device is the linear variable differential transformer which does not introduce friction, but is very long compared to the displacement it is designed to measure. For instance, to measure a displacement of six inches in either direction along a given line the differential transformer must be approximately 30 inches long.

The device described herein incorporates the advantages of the variable differential transformer while overcoming its disadvantage of excessive length. It is designed to allow displacement of a plurality of special armature rods and coils relative to one another to change the flow of magnetic flux and current therethrough. The change of current flow indicates the magnitude of the displacement.

Figure 1:
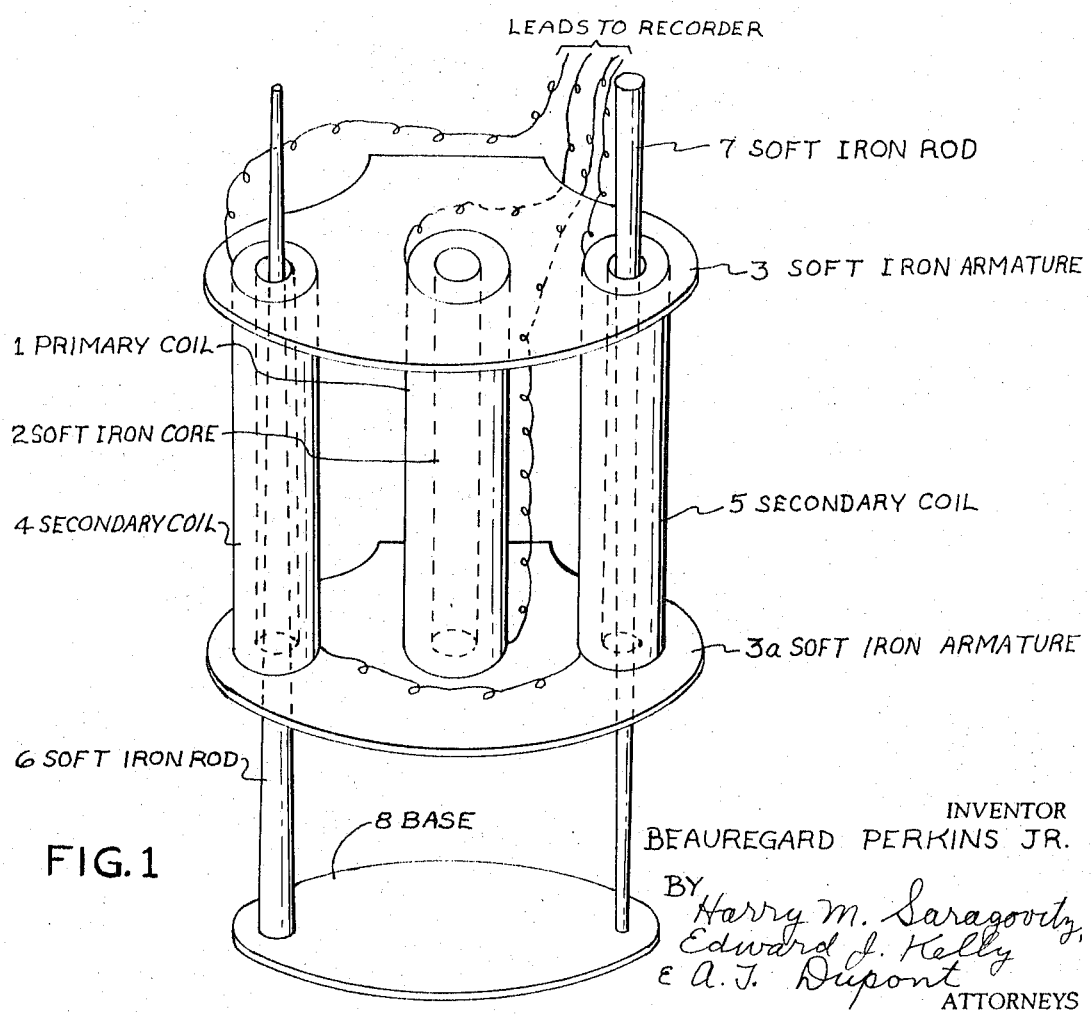
FIGURE 1 is a diagrammatic view of the invention.

The invention illustrated in FIGURE 1 consists of a primary coil 1 with a soft iron core 2, a secondary coil 4 and a secondary coil 5, both with air cores. These three coils are held in position by two soft iron armatures 3, 3a which form a top and bottom plate for the assembly. Two soft iron tapered rods 6 and 7 extend through the air cores of the secondary coils 4 and 5. The tapered ends of rods 6 and 7 point in opposite directions. An end of each rod is fixed to a base 8 while the assembly of the armatures and coils is attached to the object whose displacement is to be measured and is free to move parallel to the rods but without touching them. When coil 4 is near the thick end of rod 6, coil 5 will be near the thin end of rod 7. If the primary coil 1 is excited by an alternating current, lines of magnetic flux will alternate through the armatures to the secondary coils and through the soft iron rods 6 and 7 within the coils inducing an electromotive force in the coils. When coil 4 is near the thick end of rod 6, the EMF generated by the alternating magnetic field will be greater than when it is at the thin end of rod 6, since the thicker rod will permit more lines of flux to pass through the coil. If the secondary coils 4 and 5 are identical in dimensions and windings, and if the rods are identical in shape and dimensions, the electromotive force generated in the two secondary coils will be equal when the coils are in the central position. When coil 4 is displaced toward the thick end of rod 6, the EMF generated in coil 4 will be greater than the EMF generated in coil 5 since the soft iron of rod 6 within the coil 4 will be thicker than the soft iron of rod 7 within coil 5. If the displacement is in the opposite direction the reverse is true. If the coils 4 and 5 are connected in series-bucking and the output is connected to a phase sensitive carrier-recording system, the position of the assembly with respect to the center of the rods can be determined at any time.

The design of the instrument permits the construction of a sensing device that is only about one inch longer than the displacement it is designed to measure. This is accomplished by the use of the tapered rods and the two secondary coils. The tapered rods 6 and 7 may be made of any material of high magnetic permeability and low retentivity such as "Permalloy" in lieu of the soft iron.

Figure 2:
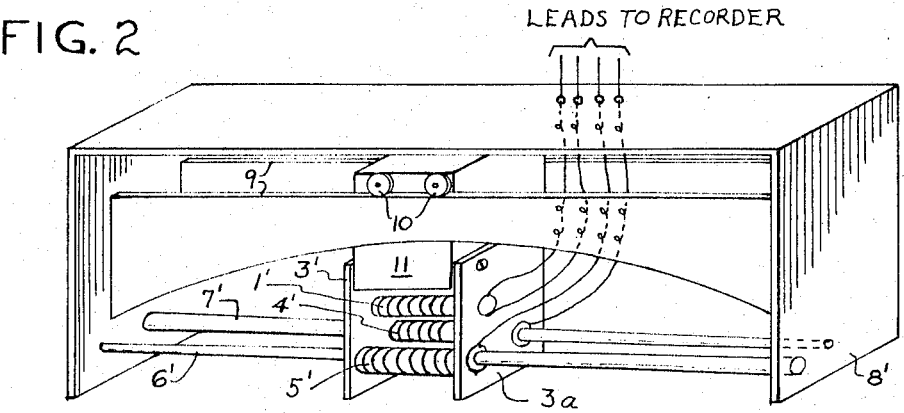
FIGURE 2 is a diagrammatic view of a modification.

In FIGURE 2 the invention is applied to a horizontal displacement transducer. Parts similar to those in FIGURE 1 are designated by the same reference numbers with primes. The assembly of the coils and armatures is attached to the inertial mass of the displacement transducer. The tapered rods are attached to the base 8' which is inserted in a case containing the displacement transducer. The relative displacement of the inertial mass and the base, which is the equivalent of the horizontal movement of the ground adjacent to the transducer, will be sensed by the transducer and recorded at a remote station. Tracks 9 and rollers 10 allow low-frictional movement of the inertial mass assembly 1' to 5' and 11 relative to base assembly 8'.

The displacement transducer can be used to measure a large relative displacement of two bodies or, in the modification of FIGURE 2, measure movement of several inches of a structure. The motions can be recorded at some safe and remote station.

I claim:

1. A displacement transducer comprising apparatus producing a magnetic field, a pair of substantially parallel coils, magnetizable means extending from said apparatus to said pair of coils, said magnetizable means comprising a pair of substantially parallel tapered members extending into close proximity with said coils, said tapered members being tapered in opposite directions and connected together for movement in unison relative to said coils whereby movement in one direction results in increased flow of magnetic flux from said apparatus to one of said coils and movement in the opposite direction results in increased flow of flux to the other coil.

2. Apparatus as in claim 1 wherein said coils are oppositely wound, relative movement between said apparatus and said coils in one direction resulting in increased electromotive force induced in one coil and decreased electromotive force induced in the other coil, and relative movement in the other direction resulting in decreased electromotive force induced in said one coil and increased electromotive force induced in said other coil.

3. Apparatus as in claim 1, said coils being fixed with respect to an inertial mass, said tapered members being mounted on a base for horizontal reciprocal movement relative to said inertial mass.

4. Apparatus as in claim 3 and, guide tracks and roller members providing for low-friction movement of said base and members relative to said inertial mass and rods.

References Cited

UNITED STATES PATENTS

| | | | |
|---|---|---|---|
| 1,978,600 | 10/1934 | Polydoroff | 336—136 X |
| 2,192,619 | 3/1940 | Polydoroff | 336—131 X |
| 2,552,999 | 5/1951 | Pannell et al. | 366—136 X |
| 2,581,202 | 1/1952 | Post | 336—131 X |
| 2,662,223 | 12/1953 | Brower | 336—136 X |
| 3,218,591 | 11/1965 | Caruthers | 336—136 X |

LARAMIE E. ASKIN, *Primary Examiner.*

LEWIS H. MYERS, *Examiner.*

T. J. KOZMA, *Assistant Examiner.*